(12) United States Patent
Vogel et al.

(10) Patent No.: US 12,319,413 B2
(45) Date of Patent: Jun. 3, 2025

(54) PASSENGER SEAT ARRANGEMENT WITH SENSOR DATA ACQUISITION, AND PASSENGER AIRCRAFT HAVING SUCH A SEAT ARRANGEMENT

(71) Applicant: KID-Systeme GmbH, Buxtehude (DE)

(72) Inventors: Carsten Vogel, Buxtehude (DE); Matthias Zachäus, Buxtehude (DE)

(73) Assignee: KID-Systeme GmbH, Buxtehude (DE)

( * ) Notice: Subject to any disclaimer, the term of this patent is extended or adjusted under 35 U.S.C. 154(b) by 75 days.

(21) Appl. No.: 17/994,767

(22) Filed: Nov. 28, 2022

(65) Prior Publication Data
US 2023/0166844 A1 Jun. 1, 2023

(30) Foreign Application Priority Data
Nov. 30, 2021 (EP) .................................. 21211250

(51) Int. Cl.
*B64D 11/06* (2006.01)
*B64D 11/00* (2006.01)
(Continued)

(52) U.S. Cl.
CPC .... *B64D 11/0624* (2014.12); *B64D 11/00155* (2014.12); *G01W 1/02* (2013.01); *G01W 1/10* (2013.01)

(58) Field of Classification Search
CPC ............ B64D 11/0624; B64D 11/0696; B64D 11/00155; B64D 2013/0655
See application file for complete search history.

(56) References Cited

U.S. PATENT DOCUMENTS

| 6,016,016 A * | 1/2000 | Starke ................ B64D 11/0624 710/302 |
| 8,321,611 B2 * | 11/2012 | Francois .......... B64D 11/00151 710/9 |

(Continued)

FOREIGN PATENT DOCUMENTS

| DE | 19722922 A1 | 12/1998 |
| DE | 102009009189 A1 | 8/2010 |

(Continued)

OTHER PUBLICATIONS

European Search Report dated May 6, 2022; priority document.

*Primary Examiner* — Philip J Bonzell
*Assistant Examiner* — Eric Acosta
(74) *Attorney, Agent, or Firm* — Greer, Burns & Crain, Ltd.

(57) ABSTRACT

A passenger seat arrangement for a passenger aircraft has a passenger seat assembly having at least one passenger seat, an electrical energy supply system which has a first electronics housing, in which electrical power converter components are arranged, and a second electronics housing, in which electrical output connections for connecting electronic terminals are arranged, and a multiplicity of sensors which are assigned to the passenger seat assembly and are coupled to a sensor data interface of the first electronics housing of the electrical energy supply system. The electrical energy supply system has a sensor data processing device which is configured to preprocess sensor data acquired from the sensors via the sensor data interface and to forward the data to a central sensor data evaluation apparatus of the passenger aircraft.

17 Claims, 1 Drawing Sheet

(51) Int. Cl.
*G01W 1/02* (2006.01)
*G01W 1/10* (2006.01)

(56) References Cited

U.S. PATENT DOCUMENTS

| | | | |
|---|---|---|---|
| 10,093,419 B2 * | 10/2018 | Gagnon | B64D 13/06 |
| 2004/0048582 A1 * | 3/2004 | Mattes | G08C 19/08 |
| | | | 455/99 |
| 2017/0066534 A1 * | 3/2017 | Sharma | B64D 11/06 |
| 2017/0283086 A1 | 10/2017 | Garing et al. | |
| 2018/0079507 A1 * | 3/2018 | Klose | B64C 1/1476 |
| 2018/0229847 A1 | 8/2018 | Smallhorn | |
| 2020/0130844 A1 | 4/2020 | Hahn et al. | |

FOREIGN PATENT DOCUMENTS

| | | |
|---|---|---|
| DE | 102018128138 A1 | 5/2020 |
| EP | 3141483 A1 | 3/2017 |
| EP | 3363737 A1 | 8/2018 |
| EP | 3578462 A1 | 12/2019 |
| GB | 2496452 A | 5/2013 |
| WO | 2015022238 A1 | 2/2015 |

\* cited by examiner

US 12,319,413 B2

PASSENGER SEAT ARRANGEMENT WITH SENSOR DATA ACQUISITION, AND PASSENGER AIRCRAFT HAVING SUCH A SEAT ARRANGEMENT

CROSS-REFERENCES TO RELATED APPLICATIONS

This application claims the benefit of the European patent application No. 21211250.2 filed on Nov. 30, 2021, the entire disclosures of which are incorporated herein by way of reference.

FIELD OF THE INVENTION

The invention relates to a seat arrangement for passengers with sensor data acquisition by a multiplicity of sensors assigned to the seat arrangement, to a passenger aircraft having such a seat arrangement, and to a method for passenger-based sensor data acquisition in a passenger seat arrangement in a passenger aircraft.

BACKGROUND OF THE INVENTION

Personal electronic devices (PEDs) are nowadays ubiquitous. These PEDs are normally carried by the user wherever he travels, even on board aircraft. For the comfort of the passengers, it is desirable to provide the passengers on board an aircraft with the possibility of charging the electrical energy stores of the PEDs while on board the aircraft or to keep the PEDs in mains operation. Airlines generally provide charging possibilities for PEDs such as laptops, mobile telephones, smartphones, tablet PCs and the like, in which USB connections or power supply system connections for each passenger are individually used at the passenger's respective aircraft seat.

In order to locally supply electrical loads—both permanently installed devices and mobile devices such as PEDs—on board an aircraft, use is made of locally installed power distribution systems with power converters, to which a multiplicity of electrical loads with different power requirements can be connected. Power distribution systems for seat groups in passenger aircraft, for example, may equally supply PEDs of all passengers of the seat group with electrical power, for example for mains operation and/or for charging the energy stores of the PEDs.

The document EP 3 578 462 A1 discloses a passenger assistance system having an artificial intelligence processing unit, which system is equipped with a sensor interface for acquiring environmental variables in the cabin of a passenger aircraft. The document DE 10 2009 009 189 A1 discloses a sensor network in an aircraft, in which data from a plurality of sensor nodes distributed in the aircraft are acquired in a central data collection and evaluation unit. The document GB 2 496 452 A discloses an aircraft seat having actuators and a seat occupancy sensor system. The document DE 10 2018 128 138 A1 discloses a method for analyzing seating comfort in an aircraft seat. The document EP 3 141 483 A1 discloses a management system for the well-being, safety and comfort of an aircraft passenger with a sensor system linked to the seat. The document US 2017/0283086 A1 discloses a crew information system for an aircraft crew, which system is connected to sensors in passenger seats, luggage compartments and seatbelts for sensor data acquisition.

SUMMARY OF THE INVENTION

One of the objects of the invention is to find solutions for acquiring different data in the direct passenger environment of a passenger of a passenger aircraft, which data can be centrally collected and evaluated.

According to a first aspect of the invention, a passenger seat arrangement for a passenger aircraft comprises a passenger seat assembly having at least one passenger seat, an electrical energy supply system which has a first electronics housing, in which electrical power converter components are arranged, and a second electronics housing, in which electrical output connections for connecting electronic terminals are arranged, and a multiplicity of sensors which are assigned to the passenger seat assembly and are coupled to a sensor data interface of the first electronics housing of the electrical energy supply system. The electrical energy supply system has a sensor data processing device which is designed to preprocess sensor data acquired from the sensors via the sensor data interface and to forward the data to a central sensor data evaluation apparatus of the passenger aircraft.

According to a second aspect of the invention, a passenger aircraft comprises at least one passenger seat arrangement according to the first aspect of the invention, as well as a passenger cabin, at least one electrical energy source, and a sensor data evaluation apparatus. The at least one passenger seat arrangement is installed in the cabin floor of the passenger cabin using a seat fastening rail. The second electronics housing is respectively connected to the at least one electrical energy source via electrical supply lines running along in or on the seat fastening rail.

According to a third aspect of the invention, a method for passenger-based sensor data acquisition in a passenger seat arrangement in a passenger aircraft comprises the steps of acquiring passenger-based sensor data by means of a multiplicity of sensors assigned to a passenger seat assembly having at least one passenger seat, transmitting the acquired passenger-based sensor data via a sensor data interface of a first electronics housing, in which electrical power converter components are arranged, of an electrical energy supply system assigned to the passenger seat assembly, preprocessing the sensor data acquired from the sensors via the sensor data interface by means of a sensor data processing device of the electrical energy supply system, and forwarding the sensor data preprocessed by the sensor data processing device to a central sensor data evaluation apparatus of the passenger aircraft.

An important idea of the invention involves simultaneously implementing, in an electrical energy supply device for passenger seats of a passenger aircraft, a data interface for sensors on and around the passenger seat of the passenger aircraft. This makes it possible to control different sensors, the sensor data from which are acquired intermittently or continuously and preprocessed locally in the electrical energy supply device. The passenger-based sensor data preprocessed in this manner can then be augmented with further aircraft-based or environment-based data and centrally evaluated.

According to some embodiments of the passenger seat arrangement according to the invention, the multiplicity of sensors may comprise optical sensors, seat occupancy sensors, seat position sensors, temperature sensors, current sensors, voltage sensors, motion sensors and/or ultrasonic sensors.

According to some further embodiments of the passenger seat arrangement according to the invention, the sensor data processing device may also be designed to receive environmental data from the environment of the passenger aircraft and to preprocess the sensor data acquired from the sensors via the sensor data interface in conjunction with the received environmental data. In some embodiments, these received environmental data may comprise data relating to the geographical position of the passenger aircraft, the ambient temperature of the passenger aircraft, the departure point and/or destination of the passenger aircraft, the forecasted weather at the departure point and/or destination of the passenger aircraft and/or the local time of the passenger aircraft.

According to some further embodiments of the passenger seat arrangement according to the invention, the electrical output connections of the second electronics housing may comprise USB sockets, seat lighting connections of passenger seats, AC voltage connections and/or seat actuator connections. The sensor data acquired from the sensors via the sensor data interface may comprise in this case time-resolved usage data relating to the USB sockets, seat lighting connections, AC voltage connections and/or seat actuator connections.

According to some embodiments of the passenger aircraft according to the invention, the passenger aircraft may also have an avionics server which is coupled to the first electronics housing of the electrical energy supply system and which is designed to forward environmental data from the environment of the passenger aircraft to the sensor data processing device.

According to some further embodiments of the passenger aircraft according to the invention, the multiplicity of sensors may have sensors which are arranged in a passenger service unit above the passenger seat arrangement.

According to some further embodiments of the passenger aircraft according to the invention, the passenger seat arrangement may have at least two passenger seats arranged beside one another. In this case, the passenger seat arrangement may have a terminal of an on-board entertainment system, and the sensor data evaluation apparatus of the passenger aircraft may be designed to evaluate acquired sensor data from the sensor data processing device and, on the basis of the evaluated sensor data, to transmit passenger-based display contents to the assigned terminal of an on-board entertainment system for each of the passenger seat arrangements.

According to some further embodiments of the passenger aircraft according to the invention, the sensor data processing device may be connected to the sensor data evaluation apparatus of the passenger aircraft via data lines running along in or on the seat fastening rail.

According to some embodiments of the method according to the invention, the method may also have the step of acquiring environmental data from the environment of the passenger aircraft, which data are taken into account by the sensor data processing device when preprocessing the sensor data acquired from the sensors via the sensor data interface. In this case, in some embodiments, the received environmental data may comprise data relating to the geographical position of the passenger aircraft, the ambient temperature of the passenger aircraft, the departure point and/or destination of the passenger aircraft, the forecasted weather at the departure point and/or destination of the passenger aircraft and/or the local time of the passenger aircraft.

According to some further embodiments of the method according to the invention, the multiplicity of sensors may comprise optical sensors, seat occupancy sensors, seat position sensors, temperature sensors, current sensors, voltage sensors, motion sensors and/or ultrasonic sensors.

The above configurations and developments can be combined with one another in any desired manner, if useful. Further possible configurations, developments and implementations of the invention also comprise combinations, not explicitly mentioned, of features of the invention described above or below with respect to the exemplary embodiments. In particular, in this case, a person skilled in the art will also add individual aspects as improvements or additions to the respective basic form of the present invention.

BRIEF DESCRIPTION OF THE DRAWINGS

The present invention is explained in more detail below on the basis of the exemplary embodiments indicated in the schematic figures, in which.

Figure 1:
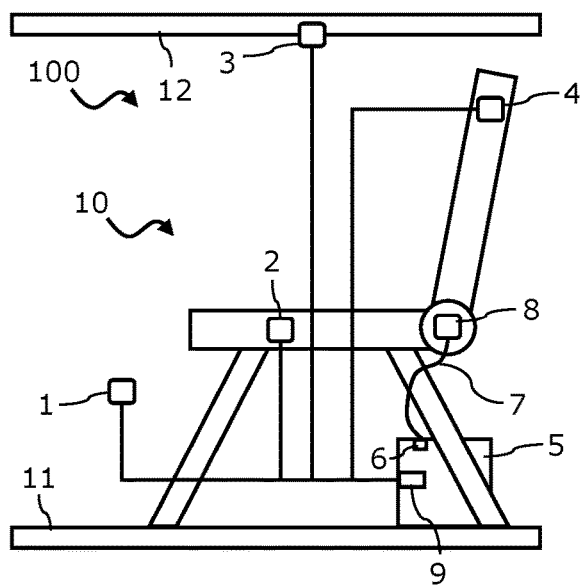
FIG. 1 shows a schematic illustration of a side view of a passenger seat arrangement for a passenger aircraft according to one embodiment of the invention.

The accompanying figures are intended to impart a further understanding of the embodiments of the invention. They illustrate embodiments and are used, in conjunction with the description, to explain principles and concepts of the invention. Other embodiments and many of the advantages mentioned are evident in view of the drawings. The elements in the drawings are not necessarily shown in a manner true to scale with respect to one another. Direction-indicating terminology, for instance "at the top", "at the bottom", "on the left", "on the right", "above", "below", "horizontal", "vertical", "at the front", "at the rear" and similar statements are used merely for explanatory purposes and are not used to restrict the generality to specific configurations as shown in the figures.

In the figures of the drawing, identical, functionally identical and identically acting elements, features and components are each provided with the same reference signs, unless stated otherwise.

DETAILED DESCRIPTION OF THE PREFERRED EMBODIMENTS

Personal electronic devices (PEDs) in the sense of this invention comprise all electronic devices which can be used for entertainment, communication and/or office purposes. For example, PEDs may comprise all types of terminals such as laptops, mobile telephones, smartphones, handheld devices, palmtops, tablet PCs, GPS devices, navigation devices, audio devices such as MP3 players, portable DVD or Blu-ray® players or digital cameras.

Passenger seats in the sense of this invention may comprise any form of structural parts of a vehicle which are intended to accommodate a passenger for the duration of the journey with the vehicle. In particular, passenger seats in aircraft may be personally and at least temporarily used solely by the aircraft passenger during the flight. Seats or passenger seats in the sense of the invention may be aircraft seats divided into seat assemblies or else loungers, armchairs, beds, suites in first class or business class or similar items of seating furniture inside an aircraft.

Power converter components in the sense of the present invention are all circuits and devices which can be used to convert one supplied type of electrical current—direct current or alternating current—into the respective other type or to change characteristic parameters such as the voltage and the frequency of a supplied type of electrical current. Power converter components may comprise current converters, for example. Such current converters may comprise rectifiers for converting alternating current into direct current, inverters for converting direct current into alternating current, converters for converting one type of alternating current into another type of alternating current or DC/DC converters for converting one type of direct current into another type of direct current. Power converter components in the sense of the present invention may be designed with the aid of analog component parts such as resistors, inductances and capacitors and/or electronic components based on semiconductors, for example diodes, transistors or thyristors.

Figure 2:
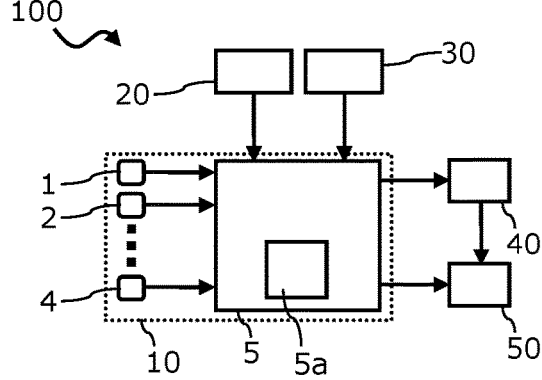
FIG. 2 shows a schematic block diagram of components of a passenger seat arrangement for a passenger aircraft according to one embodiment of the invention.
Figure 3:
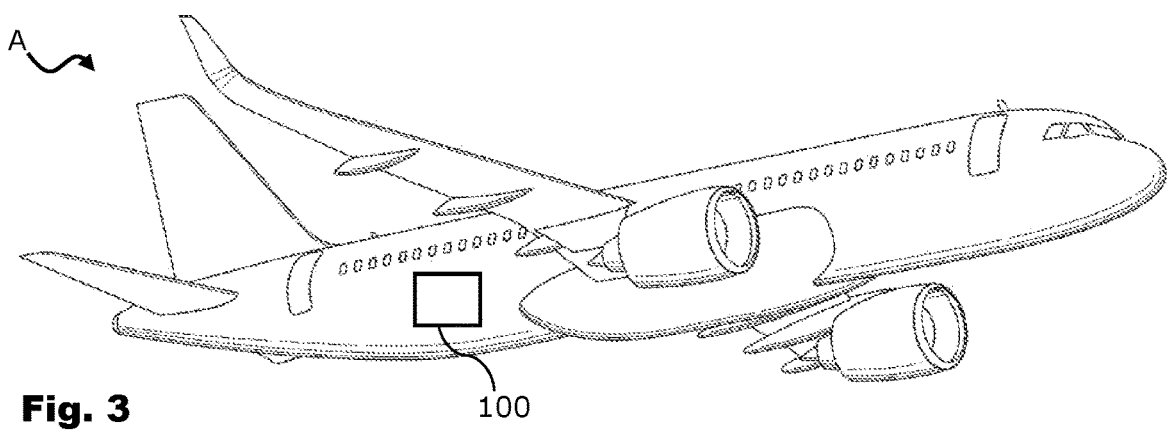
FIG. 3 shows a schematic illustration of an aircraft having a passenger seat arrangement according to FIG. 1 or 2 according to a further embodiment of the invention.

FIG. 1 shows a side view of a passenger seat arrangement 100 in a schematic structure. FIG. 2 shows a schematic block diagram of components of a passenger seat arrangement 100 and accordingly assigned peripheral components in a passenger aircraft. The passenger seat arrangement 100 may have, for example, a passenger seat assembly 10 in a passenger aircraft, for instance the aircraft A schematically illustrated in FIG. 3. In this case, a passenger aircraft A may comprise different passenger seat assemblies which are fixedly or permanently installed in a passenger cabin, for example, using one or more seat fastening rails 11 running in the passenger cabin floor.

The passenger seat assembly 10 may have one or more passenger seats which have, for example, a seating surface and a backrest hinged to the seating surface. In this case, the passenger seats may be arranged beside one another, for example, which is to say with seating surfaces adjoining one another laterally, with the result that a plurality of passengers may simultaneously each occupy one passenger seat in the passenger seat assembly 10.

Furthermore, the passenger seat assembly 10 may have a seat supporting frame having front supporting feet and rear supporting feet which support and carry the seating surface. The passenger seat assembly 10 may be installed on one or more seat fastening rails 11 in the passenger cabin via the seat supporting frame. The seat fastening rails 11 may have in this case, for example, a running direction in the cabin floor along the longitudinal axis of the passenger aircraft A and, in particular, may run parallel to one another in the case of a plurality of seat fastening rails 11.

Electrical supply lines may run in or along the seat fastening rails 11, may be electrically connected to energy supply systems assigned to respective passenger seat assemblies 10 via the electrical energy sources on board the passenger aircraft A and may be supplied with electrical energy.

In this case, each passenger seat arrangement 100 in a passenger aircraft A may have, for example, a separate energy supply system locally installed in the passenger aircraft A. In this case, the energy supply systems may have a modular structure, as illustrated in FIG. 1, for example. A basic module of the respective energy supply system may be able to be installed on one of the seat fastening rails 11, while an associated peripheral module of the energy supply system is installed on the passenger seat assembly 10 at a position suitable for connecting electrical loads. The energy supply systems may be supplied by means of one or more electrical energy sources (not explicitly illustrated) in the passenger aircraft A.

The electrical energy sources may have, for example, one or more AC voltage sources, for example generators, in particular engine generators or generators of ram-air turbines. Alternatively or additionally, the electrical energy sources may comprise, for example, DC voltage sources, for instance photovoltaic installations or fuel cells. The electrical energy sources may be electrically coupled to the respective basic modules of the energy supply systems via electrical supply lines which run along in or on the seat fastening rails 11.

The energy supply systems may be intended, for example, to supply permanently installed electrical loads, for instance displays of an on-board entertainment system on board a passenger aircraft, seat lighting systems of passenger seats, seat actuators or the like, as well as temporarily connected electrical loads, for example PEDs, power banks or similar loads, which are each assigned to a seat of the passenger seat arrangement 100 and are provided for use by a passenger booked onto the respective seat for the duration of a journey.

As illustrated in FIGS. 1 and 2, the electrical energy supply system has a modular structure such that the basic module has a first electronics housing 5, in which electrical power converter components are arranged. The first electronics housing 5 may be installed on or at least one of the seat fastening rails 11—other installation possibilities, for example on a supporting frame of the passenger seat assembly 10 or the like, are likewise possible, however.

A peripheral module of the electrical energy supply system may be accommodated in a second electronics housing 8 which is separated from the first electronics housing 5. The first electronics housing 5 may have a supply connection 6 which can be used to electrically connect one or more second electronics housings 8 via electrical supply lines 7 in the form of wired cabling. As a result of the separation between the first and second electronics housings 5 and 8 in the basic module and in the peripheral module, the second electronics housing 8 can be placed on the passenger seat assembly 10 according to ergonomic aspects.

The second electronics housing 8 accommodates electrical output connections for connecting electronic terminals, for example PEDs of passengers. The electrical output connections may comprise, for example, USB sockets, seat lighting connections of passenger seats, AC voltage connections and/or seat actuator connections. The supply connection 6 of the electrical power converter components of the first electronics housing 5 is electrically connected to the electrical output connections of the second electronics housing 8 via the wired cabling 7.

The electrical output interfaces in the second electronics housing 8 may be, in particular, USB interfaces which operate according to the USB power delivery and/or the USB battery charging specification. Electrical loads which are connected to these USB interfaces, for example PEDs of passengers of a passenger aircraft A, can therefore obtain electrical power from the energy supply system.

Openings for passive air cooling of the electrical power converter components arranged in the first electronics housing 5 may be provided in the latter. Alternatively or additionally, it may also be possible to actively cool the electrical power converter components inside the first electronics housing 5 by means of a suitable cooling system.

In the immediate environment of the passenger seat assembly 10, the passenger seat arrangement 100 has a multiplicity of sensors which are assigned to the respective passenger seat assembly 10 and are each coupled to a sensor data interface 9 of the first electronics housing 5 of the electrical energy supply system. For example, it is possible to provide an optical sensor 1 which can acquire optical signals, for instance video recordings or other image data, from the passenger seat and/or a passenger assigned to the passenger seat. A seat occupancy sensor 2, for example, can measure the load on a seating surface in order to thereby determine whether there is a passenger on the seat and whether the passenger is carrying out movements. A seat position sensor 4 may be provided, for example, in the backrest of the passenger seat in order to determine the inclination of the backrest. Other sensors 3, for example temperature sensors, current sensors, voltage sensors, motion sensors and/or ultrasonic sensors, may likewise be provided, for example in a passenger service device 12 arranged above the passenger seat assembly 10. It may also be possible for electrical sensors, for instance voltage and/or current sensors, to be connected to electrical output connections of the second electronics housing 8 (for example USB sockets, seat lighting connections of passenger seats, AC voltage connections and/or seat actuator connections) in order to acquire time-resolved usage data relating to the USB sockets, seat lighting connections, AC voltage connections and/or seat actuator connections.

The sensor data acquired by the various sensors 1, 2, 3 and/or 4 may be fed into the first electronics housing 5 via a sensor data interface 9. A sensor data processing device 5a is arranged in the first electronics housing 5 and is designed to preprocess the sensor data acquired from the sensors 1, 2, 3 and/or 4. After preprocessing, the preprocessed sensor data are forwarded to a central sensor data evaluation apparatus 40 of the passenger aircraft A. The central sensor data evaluation apparatus 40 of the passenger aircraft A can therefore respectively determine and centrally evaluate passenger-based sensor data from different passenger seat arrangements 100 distributed in the passenger aircraft.

In addition to the sensor data acquired by the various sensors 1, 2, 3 and/or 4, environmental data from the environment of the passenger aircraft A may also be taken into account in the sensor data processing device 5a. For this purpose, environmental data from the environment of the passenger aircraft A can be received. These environmental data may comprise, for example, data relating to the geographical position of the passenger aircraft A, the ambient temperature of the passenger aircraft A, the departure point and/or destination of the passenger aircraft A, the forecasted weather at the departure point and/or destination of the passenger aircraft A and/or the local time of the passenger aircraft A. In this case, environmental data may come, for example, from an avionics server 20 on board the passenger aircraft A and/or from a further environmental data source 30 outside the passenger aircraft A, for example a server on the ground or an avionics server of another passenger aircraft. The sensor data processing device 5a receives the environmental data, correlates the received environmental data with the acquired sensor data in terms of location and time and takes into account correlations determined in this manner when preprocessing the sensor data acquired from the sensors via the sensor data interface 9.

Figure 4:
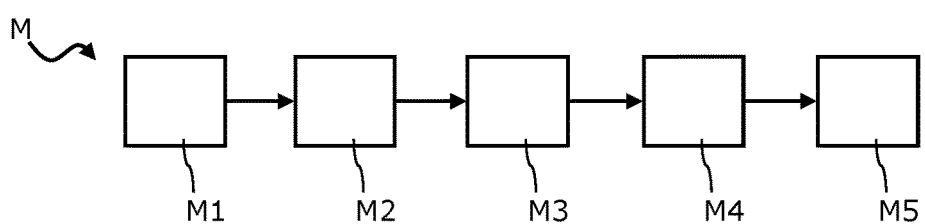
FIG. 4 shows a schematic flowchart of the steps of a method for passenger-based sensor data acquisition in a passenger seat arrangement in a passenger aircraft according to a further embodiment of the invention.

FIG. 4 shows a flowchart of method steps of a method M for passenger-based sensor data acquisition in a passenger seat arrangement in a passenger aircraft, for example the passenger seat arrangement 100 explained and shown in connection with FIGS. 1 and 2. The method M can be carried out, in particular, in a passenger aircraft A having passenger seat arrangements 100 as explained in connection with FIG. 3.

In a first step M1, passenger-based sensor data are first of all acquired by means of a multiplicity of sensors assigned to a passenger seat assembly 10 having at least one passenger seat. For example, such sensors may comprise optical sensors, for instance video cameras, seat occupancy sensors, seat position sensors, temperature sensors, current sensors, voltage sensors, motion sensors and/or ultrasonic sensors. The optical sensors may be, for example, sensors which are installed in a backrest or a passenger service device and can monitor the seat position, eye movements or other physical features of a passenger permanently or at particular intervals of time. Current or voltage sensors may be provided in order to monitor the use of the electrical output connections for connecting electronic terminals, which are arranged in the second electronics housing 8 of the electrical energy supply system, on the passenger seat assembly 10. Seat occupancy sensors may monitor whether a passenger is sitting on his seat or whether and the extent to which the passenger is moving on his seat, in order to be able to monitor, for example, whether the passenger is currently sleeping. Seat position sensors may monitor, for example, an adjustment of the backrest of a passenger seat.

In a step M2, the acquired passenger-based sensor data may be transmitted via a sensor data interface 9 of a first electronics housing 5, in which electrical power converter components are arranged, of an electrical energy supply system assigned to the passenger seat assembly 10. The acquired sensor data may be preprocessed in a step M3 by a sensor data processing device 5a of the electrical energy supply system. The sensor data processing device 5a may be, for example, a dedicated processor which is accommodated in the first electronics housing 5 and is coupled to the sensor data interface 9.

Optionally, in a step M4, environmental data from the environment of the passenger aircraft A may be received. These environmental data may comprise, for example, data relating to the geographical position of the passenger aircraft A, the ambient temperature of the passenger aircraft A, the departure point and/or destination of the passenger aircraft A, the forecasted weather at the departure point and/or destination of the passenger aircraft A and/or the local time of the passenger aircraft A. In this case, environmental data may come, for example, from an avionics server 20 on board the passenger aircraft A and/or from a further environmental data source 30 outside the passenger aircraft A, for example a server on the ground or an avionics server of another passenger aircraft. The sensor data processing device 5a receives the environmental data, correlates the received environmental data with the acquired sensor data in terms of location and time and takes into account correlations determined in this manner when preprocessing the sensor data acquired from the sensors via the sensor data interface 9.

Finally, in a step M5, the sensor data preprocessed by the sensor data processing device 5a and possibly processed taking into account the received environmental data are forwarded to a central sensor data evaluation apparatus 40 of the passenger aircraft A. For this purpose, the sensor data processing device 5a may be connected to the sensor data evaluation apparatus 40 of the passenger aircraft A via data lines running along in or on the seat fastening rail 11. Alternatively or additionally, wireless data transmission may also take place from the respective sensor data processing devices 5a to the central sensor data evaluation apparatus 40 of the passenger aircraft A. The central sensor data evaluation apparatus 40 may evaluate the acquired sensor data from the sensor data processing device 5a and, on the basis thereof, may provide different further units on board the passenger aircraft A with passenger-based information. For example, the central sensor data evaluation apparatus 40 may be coupled to one or more terminals 50 of an on-board entertainment system of the passenger aircraft A and, on the basis of the evaluated sensor data, may transmit passenger-based display contents to the assigned terminal 50 of an on-board entertainment system for each of the passenger seat arrangements 100.

Conclusions on the needs and comfort of the individual passengers can be drawn using the acquired sensor data—possibly consulting environmental data relating to the aircraft—by means of suitable evaluation algorithms, for example on the basis of artificial intelligence. As a result, passenger-based comfort and service offers can be made in a passenger aircraft, as a result of which the passenger's stay can be made as pleasant as possible and the flight experience can be individualized. Instructions, recommendations or service suggestions can be made directly to the flight attendants in a tailored manner via the sensor data evaluation. In addition, advice and suggestions for improving the flight comfort can be presented to the passengers on their personal terminals or on terminals of the on-board entertainment system.

In the detailed description above, various features have been combined in one or more examples in order to improve the rigorousness of the illustration. However, it should be clear in this case that the above description is of a merely illustrative but in no way restrictive nature. It is used to cover all alternatives, modifications and equivalents of the various features and exemplary embodiments. Many other examples will be immediately and directly clear to a person skilled in the art on the basis of his technical knowledge in view of the above description.

The exemplary embodiments were selected and described in order to be able to present the principles on which the invention is based and their possible uses in practice in the best possible manner. As a result, experts can optimally modify and use the invention and its various exemplary embodiments with regard to the intended purpose. In the claims and the description, the terms "containing" and "having" are used as neutral linguistic concepts for the corresponding term "comprising".

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger seat arrangement for a passenger aircraft, comprising:
    a passenger seat assembly having at least one passenger seat;
    an electrical energy supply system which has a first electronics housing, in which electrical power converter components are arranged, and a second electronics housing, in which electrical output connections for connecting electronic terminals are arranged; and
    a multiplicity of sensors which are assigned to the passenger seat assembly and are coupled to a sensor data interface of the first electronics housing of the electrical energy supply system, wherein the multiplicity of sensors collect passenger-based sensor data,
    wherein the electrical energy supply system has a sensor data processing device accommodated within the first electronics housing which is designed to preprocess the passenger-based sensor data acquired from the sensors via the sensor data interface and to forward said preprocessed passenger-based sensor data to a central sensor data evaluation apparatus of the passenger aircraft, and
    wherein the multiplicity of sensors comprise an optical sensor installed in a backrest or a passenger service device of the at least one passenger seat which monitors at least one of seat position of the at least one passenger seat and eye movements of a passenger.

2. The passenger seat arrangement according to claim 1, wherein the multiplicity of sensors comprise at least two of optical sensors, seat occupancy sensors, seat position sensors, temperature sensors, current sensors, voltage sensors, motion sensors or ultrasonic sensors.

3. The passenger seat arrangement according to claim 1, wherein the sensor data processing device is also configured to receive environmental data from an environment of the passenger aircraft and to preprocess the passenger-based sensor data acquired from the sensors via the sensor data interface in conjunction with the received environmental data.

4. The passenger seat arrangement according to claim 3, wherein the received environmental data comprise data relating to at least one of a geographical position of the passenger aircraft, an ambient temperature of the passenger aircraft, a departure point or destination of the passenger aircraft, a forecasted weather at the departure point or destination of the passenger aircraft or a local time of the passenger aircraft.

5. The passenger seat arrangement according to claim 1,
    wherein the electrical output connections of the second electronics housing comprise at least one of USB sockets, seat lighting connections of passenger seats, AC voltage connections or seat actuator connections, and
    wherein the passenger-based sensor data acquired from the sensors via the sensor data interface comprise time-resolved usage data relating to at least one of the USB sockets, seat lighting connections, AC voltage connections or seat actuator connections.

6. A passenger aircraft comprising:
    a passenger cabin;
    at least one electrical energy source;
    a sensor data evaluation apparatus; and
    at least one passenger seat arrangement according to claim 1 which is installed in a floor of the passenger cabin using a seat fastening rail and the second electronics housing of which is respectively connected to the at least one electrical energy source via electrical supply lines running along in or on the seat fastening rail.

7. The passenger aircraft according to claim 6, further comprising an avionics server coupled to the first electronics housing of the electrical energy supply system and configured to forward environmental data from an environment of the passenger aircraft to the sensor data processing device.

8. The passenger aircraft according to claim 6, wherein the multiplicity of sensors have sensors which are arranged in a passenger service unit above the passenger seat arrangement.

9. The passenger aircraft according to claim 6, wherein the passenger seat arrangement has at least two passenger seats arranged beside one another.

10. The passenger aircraft according to claim 9, wherein the passenger seat arrangement has a terminal of an on-board entertainment system, and the sensor data evaluation apparatus of the passenger aircraft is configured to evaluate acquired passenger-based sensor data from the sensor data processing device and, based on the evaluated sensor data, to transmit passenger-based display contents to the assigned terminal of an on-board entertainment system for each of the passenger seat arrangements.

11. The passenger aircraft according to claim 6, wherein the sensor data processing device is connected to the sensor data evaluation apparatus of the passenger aircraft via data lines running along in or on the seat fastening rail.

12. The passenger seat arrangement according to claim 1, wherein the electrical energy supply system supplies permanently installed electrical loads to at least one of a display of an on-board entertainment system, a seat lighting system of the at least one passenger seat, and a seat actuator of the at least one passenger seat.

13. The passenger seat arrangement according to claim 1, wherein the multiplicity of sensors comprise a seat occupancy sensor which measures the load on a seating surface of the at least one passenger seat in order to thereby determine whether there is a passenger on the at least one passenger seat and whether the passenger is carrying out movements.

14. A method for passenger-based sensor data acquisition in a passenger seat arrangement in a passenger aircraft, comprising:
  acquiring passenger-based sensor data by means of a multiplicity of sensors assigned to a passenger seat assembly having at least one passenger seat;
  transmitting the acquired passenger-based sensor data via a sensor data interface of a first electronics housing, in which electrical power converter components are arranged, of an electrical energy supply system assigned to the passenger seat assembly;
  preprocessing the sensor data acquired from the sensors via the sensor data interface by means of a sensor data processing device of the electrical energy supply system which is accommodated within the first electronics housing; and
  forwarding the sensor data preprocessed by the sensor data processing device to a central sensor data evaluation apparatus of the passenger aircraft,
  wherein the multiplicity of sensors comprise an optical sensor installed in a backrest or a passenger service device of the at least one passenger seat which monitors at least one of seat position of the at least one passenger seat and eye movements of a passenger.

15. The method according to claim 14, further comprising the step of acquiring environmental data from an environment of the passenger aircraft, which data are taken into account by the sensor data processing device when preprocessing the sensor data acquired from the sensors via the sensor data interface.

16. The method according to claim 15, wherein the received environmental data comprise data relating to at least one of a geographical position of the passenger aircraft, an ambient temperature of the passenger aircraft, a departure point or destination of the passenger aircraft, a forecasted weather at the departure point or destination of the passenger aircraft or a local time of the passenger aircraft.

17. The method according to claim 14, wherein the multiplicity of sensors comprise at least two of optical sensors, seat occupancy sensors, seat position sensors, temperature sensors, current sensors, voltage sensors, motion sensors or ultrasonic sensors.

* * * * *